United States Patent
Zeng et al.

(10) Patent No.: US 10,505,895 B2
(45) Date of Patent: *Dec. 10, 2019

(54) METHOD AND DEVICE FOR STORING AND SENDING MAC ADDRESS ENTRY, AND SYSTEM

(71) Applicant: Huawei Technologies Co., Ltd., Shenzhen (CN)

(72) Inventors: Qing Zeng, Shenzhen (CN); Xiaohu Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

This patent is subject to a terminal disclaimer.

(21) Appl. No.: 15/370,589

(22) Filed: Dec. 6, 2016

(65) Prior Publication Data

US 2017/0085528 A1 Mar. 23, 2017

Related U.S. Application Data

(63) Continuation of application No. 13/764,444, filed on Feb. 11, 2013, now Pat. No. 9,531,663.

(30) Foreign Application Priority Data

Feb. 21, 2012 (CN) .......................... 2012 1 0039632

(51) Int. Cl.
*G06F 15/16* (2006.01)
*H04L 29/12* (2006.01)
(Continued)

(52) U.S. Cl.
CPC ...... *H04L 61/6022* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS

| 7,787,396 B1 | 8/2010 | Nalawade et al. |
| 8,170,033 B1 * | 5/2012 | Kothari ............... H04L 12/4641 370/395.53 |

(Continued)

FOREIGN PATENT DOCUMENTS

| CN | 101009629 A | 8/2007 |
| CN | 101345715 A | 1/2009 |

(Continued)

OTHER PUBLICATIONS

Aggarwal, R., et al., "BBP MPLS Based MAC VPN," Network Working Group, Internet Draft, draft-raggarwa-mac-vpn-01.txt, Jun. 2, 2010, 31 pages.

(Continued)

Primary Examiner — Umar Cheema
Assistant Examiner — Anthony T Rotolo
(74) Attorney, Agent, or Firm — Slater Matsil, LLP

(57) ABSTRACT

Embodiments of the present disclosure provide a method and a device for storing and sending a MAC address entry, and a system. The method includes: sending, by a PE, a first packet to an RR, so that the RR determines a MAC address entry required by the PE according to the first packet, where the RR pre-stores a MAC address table, and the MAC address table includes the required MAC address entry; and receiving, by the PE, a packet which includes the required MAC address entry and is sent by the RR, and storing the required MAC address entry.

22 Claims, 8 Drawing Sheets

(51) Int. Cl.
*H04L 12/751* (2013.01)
*H04L 12/46* (2006.01)
*H04L 12/741* (2013.01)

(52) U.S. Cl.
CPC .............. *H04L 45/02* (2013.01); *H04L 45/74* (2013.01); *H04L 61/10* (2013.01)

(56) References Cited

U.S. PATENT DOCUMENTS

| | | |
|---|---|---|
| 8,270,413 B2 | 9/2012 | Weill et al. |
| 8,705,513 B2 * | 4/2014 | Van Der Merwe ..... H04L 47/72 370/351 |
| 8,743,740 B2 | 6/2014 | Small et al. |
| 8,842,577 B2 | 9/2014 | Sajassi et al. |
| 2003/0208618 A1 | 11/2003 | Mor et al. |
| 2005/0169270 A1 | 8/2005 | Mutou et al. |
| 2007/0250612 A1 | 10/2007 | Elias et al. |
| 2008/0101385 A1 | 5/2008 | Elias et al. |
| 2009/0016365 A1 | 1/2009 | Sajassi et al. |
| 2009/0135722 A1 | 5/2009 | Boers et al. |
| 2009/0252061 A1 | 10/2009 | Small et al. |
| 2012/0189009 A1 * | 7/2012 | Shekhar ................ H04L 45/021 370/392 |
| 2013/0031271 A1 * | 1/2013 | Bosch ................... H04W 40/36 709/245 |

FOREIGN PATENT DOCUMENTS

| | | |
|---|---|---|
| CN | 102347889 A | 2/2012 |
| EP | 2413550 A1 | 2/2012 |

OTHER PUBLICATIONS

Wikipedia, "Virtual Private LAN Service," Wikipedia page, Jan. 23, 2012, 4 pages.

* cited by examiner

METHOD AND DEVICE FOR STORING AND SENDING MAC ADDRESS ENTRY, AND SYSTEM

CROSS-REFERENCE TO RELATED APPLICATIONS

This application is a continuation of U.S. patent application Ser. No. 13/764,444, filed on Feb. 11, 2013, which claims priority to Chinese Patent Application No. 201210039632.X, filed on Feb. 21, 2012. The disclosures of the aforementioned applications are hereby incorporated by reference in their entireties.

TECHNICAL FIELD

The present disclosure relates to network communication technologies, and in particular, to a method and a device for storing and sending a MAC address entry, and a system.

BACKGROUND

A basic concept of an Ethernet virtual private network (EVPN) solution is that a control plane learns a media access control (MAC) address through extending a border gateway protocol (BGP), so that a layer 2 virtual private network (L2VPN) function is implemented. In the EVPN solution, each provider network edge (PE) needs to store all MAC address tables of a virtual private network (VPN) site, to which any other PE connects, so as to forward a data packet according to the stored MAC address tables. The PE may also be referred to as a multi-protocol label switching (MPLS) edge switch (MES).

However, with the development of cloud computing, a scale of a data center is continuously expanding, and the number of MAC addresses rises from levels of K (thousand) and 10K (ten thousand) to levels of 100K (one hundred thousand) and M (Mega). In the prior art, the solution that each PE is required to store all the MAC address tables has high demands for both capacity and performance of the PE.

SUMMARY

Embodiments of the present disclosure provide a method and a device for storing and sending a MAC address entry, and a system, so that a PE stores a MAC address entry according to need in an EVPN scenario and demands for capacity and performance of the PE are reduced.

In one aspect, an embodiment of the present disclosure provides a method for storing a MAC address entry. The method includes: sending, by a PE, a first packet to a route reflector RR, so that the RR determines a MAC address entry required by the PE according to the first packet, where the RR pre-stores a MAC address table, and the MAC address table includes the required MAC address entry. The method also includes receiving, by the PE, a packet which includes the required MAC address entry and is sent by the RR, and storing the required MAC address entry.

In another aspect, an embodiment of the present disclosure provides a method for sending a MAC address entry. The method includes: receiving, by an RR, a first packet sent by a PE. The method also includes determining, by the RR, a MAC address entry required by the PE according to the first packet, where the RR pre-stores a MAC address table including the required MAC address entry. The method also includes sending, by the RR, the required MAC address entry to the PE.

In one aspect, an embodiment of the present disclosure provides a device for storing a MAC address entry. The device includes: a first sending module, configured to send a first packet to an RR, so that the RR determines a MAC address entry required by the PE according to the first packet, where the RR pre-stores a MAC address table, and the MAC address table includes the required MAC address entry. The device also includes a storage module, configured to receive a packet which includes the required MAC address entry and is sent by the RR, and store the required MAC address entry.

In another aspect, an embodiment of the present disclosure provides a device for sending a MAC address entry. The device includes: a receiving module, configured to receive a first packet sent by a PE. The device also includes a determining module, configured to determine a MAC address entry required by the PE according to the first packet, where the RR pre-stores a MAC address table including the required MAC address entry. The device also includes a sending module, configured to send the required MAC address entry to the PE.

An embodiment of the present disclosure further provides a network system, including the foregoing two devices.

It can be known from the foregoing technical solutions that, in the embodiments of the present disclosure, the PE sends the first packet to the RR, and the RR determines the MAC address entry required by the PE according to the first packet, and then sends the required MAC address entry to the PE for storing, so that the PE only stores the MAC address entry required by itself rather than MAC address entries corresponding to all PEs, thereby implementing that the PE stores the MAC address entry according to need, and reducing the demands for the capacity and the performance of the PE.

DETAILED DESCRIPTION OF ILLUSTRATIVE EMBODIMENTS

Figure 1:
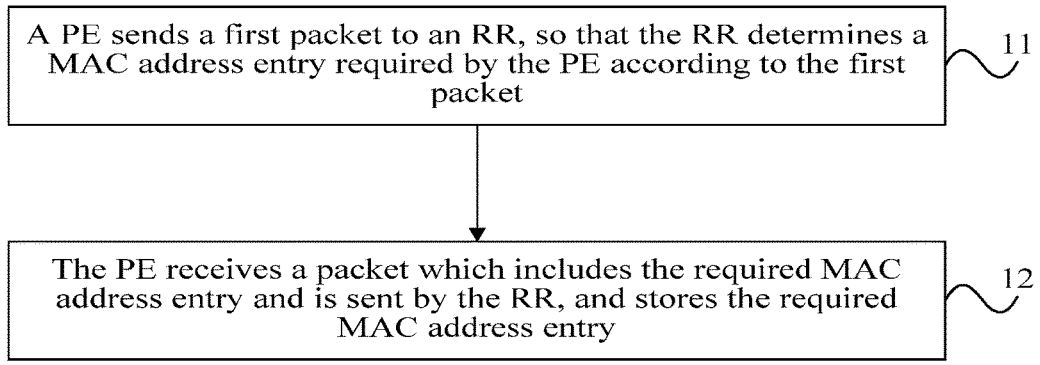
FIG. 1 is a schematic flow chart of an embodiment of a method for storing a MAC address entry according to the present disclosure.

FIG. 1 is a schematic flow chart of an embodiment of a method for storing a MAC address entry according to the present disclosure, where the method includes the following steps.

Step 11: A PE sends a first packet to a route reflector (RR), so that the RR determines a MAC address entry required by the PE according to the first packet, where the RR pre-stores a MAC address table, and the MAC address table includes the required MAC address entry.

The first packet may be a BGP outbound route filter (ORF) packet. The BGP ORF packet is a packet combining MAC ORF and route target (RT) ORF, where the MAC ORF includes a destination MAC address, and the RT ORF includes an RT. The destination MAC address is a destination MAC address included in a data packet received by the PE, and the RT is an RT corresponding to a VPN to which the data packet belongs. Afterwards, the RR may determine a corresponding VPN according to the RT, and determine a MAC address entry which corresponds to the VPN and includes the destination MAC address as the MAC address entry required by the PE.

Figure 2:
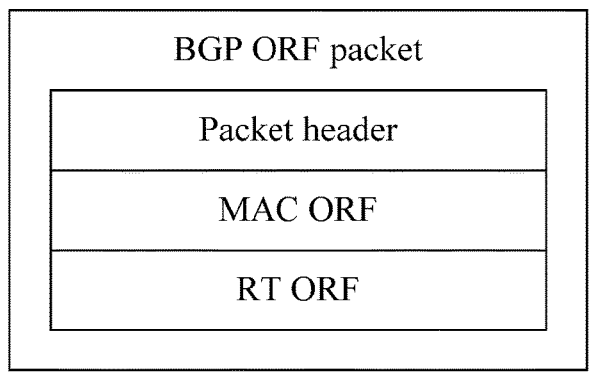
FIG. 2 is a schematic diagram of a format of a BGP ORF packet according to the present disclosure.

Referring to FIG. 2, the BGP ORF packet includes: a packet header, the MAC ORF, and the RT ORF, where the MAC ORF carries the destination MAC address, and the RT ORF carries the RT.

Figure 3A:
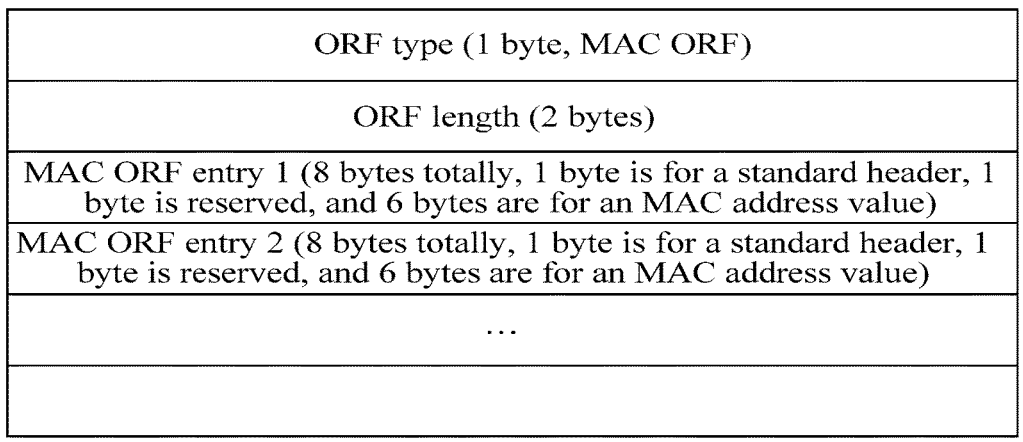
FIG. 3a is a schematic diagram of a format of MAC ORF according to the present disclosure.

Referring to FIG. 3*a*, the MAC ORF includes the following fields: ORF type, length, MAC ORF entry 1, a MAC ORF entry 2 . . . . A length of the ORF type field may be selected as 1 byte, a length of the length field may be selected as 2 bytes, and each MAC ORF entry has 8 bytes in total, where 1 byte is for a standard header, 1 byte is reserved (reserved), and 6 bytes are for a MAC address value. The 6-byte MAC address value is a destination MAC address of the data packet.

Figure 3B:
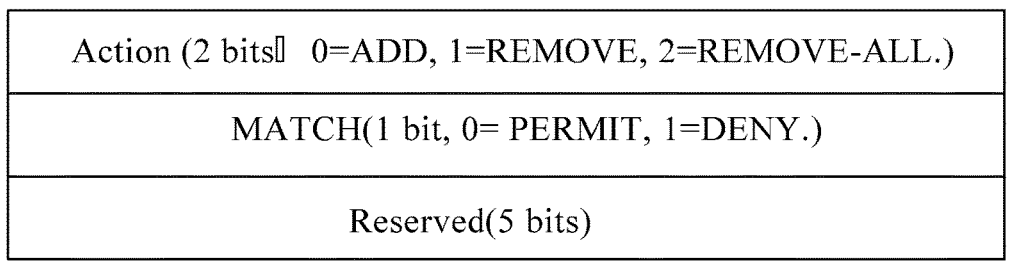
FIG. 3b is a schematic diagram of a format of a standard header of MAC ORF according to the present disclosure.

Referring to FIG. 3*b*, the 1-byte standard header includes: a 2-bit action (Action) field, a 1-bit match (MATCH) field, and a 5-bit reserved part. For values of Action, 0 represents addition (ADD), 1 represents removal (REMOVE), 2 represents removal-All (REMOVE-ALL). For values of MATCH, 0 represents permit (PERMIT), 1 represents (DENY).

In this embodiment, the BGP ORF packet is used for the PE to acquire the MAC address entry. To differentiate from a subsequent BGP ORF packet for removing the MAC address entry, the BGP ORF packet in this embodiment may be referred to as a first BGP ORF packet, and the subsequent packet for removing may be referred to as second BGP ORF packet. A value of Action in the first BGP ORF packet is 0, and a value of Action in the second BGP ORF packet is 1. In addition, a format of the RT ORF is similar to that of the MAC ORF shown in FIG. 3*a*. What is different from the MAC ORF is that, a value of an ORF type in the RT ORF is a value indicating the RT ORF, and moreover, the RT ORF includes an RT field for carrying the RT, rather than a MAC address field.

Alternatively, the first packet may also be a data packet that the PE forwards to the RR, where the data packet includes the destination MAC address, and then the RR may directly acquire the destination MAC address from the data packet. In addition, the data packet further includes a label, where the label may identify a corresponding VPN. The RR may determine a corresponding VPN according to the label, and then the RR may determine a MAC address entry which corresponds to the VPN and includes the destination MAC address as the MAC address entry required by the PE. In the embodiment of the present disclosure, the label refers to a multi-protocol label switching (MPLS) label.

Step 12: The PE receives a packet which includes the required MAC address entry and is sent by the RR, and stores the required MAC address entry.

In the prior art, PEs transmits MAC address entries of VPN Sites, to which the PEs connect, to each other, so that each PE stores MAC address entries of the VPN Sites to which all the PEs connect. In existing RR networking, the PEs send the MAC address entries of the VPN Sites, to which the PEs connect, to the RR, and the RR is responsible for forwarding the MAC address entries to other PEs. Different from the prior art, in this embodiment, the PE only requests the required MAC address entry from the RR, so that the MAC address entry is stored according to need.

Further, after storing the MAC address entry, the PE may forward the received data packet according to the MAC address entry because the MAC address entry may indicate routing information.

In this embodiment, the PE sends the first packet to the RR, and the RR determines the MAC address entry required by the PE according to the first packet, so that the PE only stores the MAC address entry required by itself rather than MAC address entries corresponding to all PEs, thereby implementing that the PE stores the MAC address entry according to need, and reducing demands for capacity and performance of the PE.

Figure 4:
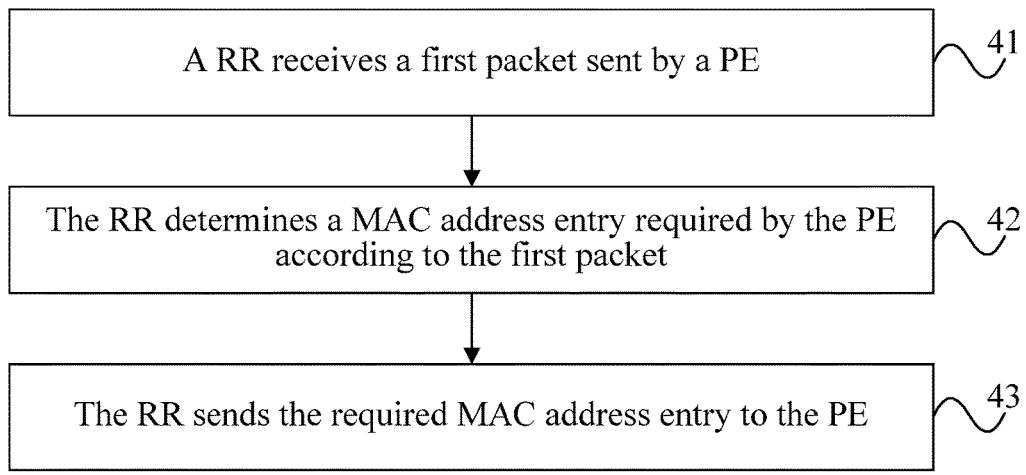
FIG. 4 is a schematic flow chart of an embodiment of a method for sending a MAC address entry according to the present disclosure.

FIG. 4 is a schematic flow chart of an embodiment of a method for sending a MAC address entry according to the present disclosure, where the method includes the following steps.

Step 41: An RR receives a first packet sent by a PE.

As described above, the first packet may be a first BGP ORF packet, or may also be a data packet.

Step 42: The RR determines a MAC address entry required by the PE according to the first packet, where the RR pre-stores a MAC address table including the required MAC address entry.

For example, when the first packet is the first BGP ORF packet including a destination MAC address and an RT, the RR determines a VPN corresponding to the RT according to a pre-stored corresponding relationship between an RT and a VPN, and then determines a MAC address entry which includes the destination MAC address and is included in a MAC address table corresponding to the VPN as the required MAC address entry according to a pre-stored corresponding relationship between a VPN and a MAC address table.

Alternatively, when the first packet is the data packet, the RR determines a corresponding VPN according to a label, and then determines a MAC address entry which includes the destination MAC address and is included in a MAC address table corresponding to the VPN as the required MAC address entry, where in the embodiment of the present disclosure, the label refers to a multi-protocol label switching (MPLS) label.

Step 43: The RR sends the required MAC address entry to the PE.

In this embodiment, the RR receives the first packet sent by the PE, and the RR determines the MAC address entry required by the PE according to the first packet, so that the PE only stores the MAC address entry required by itself rather than MAC address entries corresponding to all PEs, thereby implementing that the PE stores the MAC address entry according to need, and reducing demands for capacity and performance of the PE.

Figure 5:
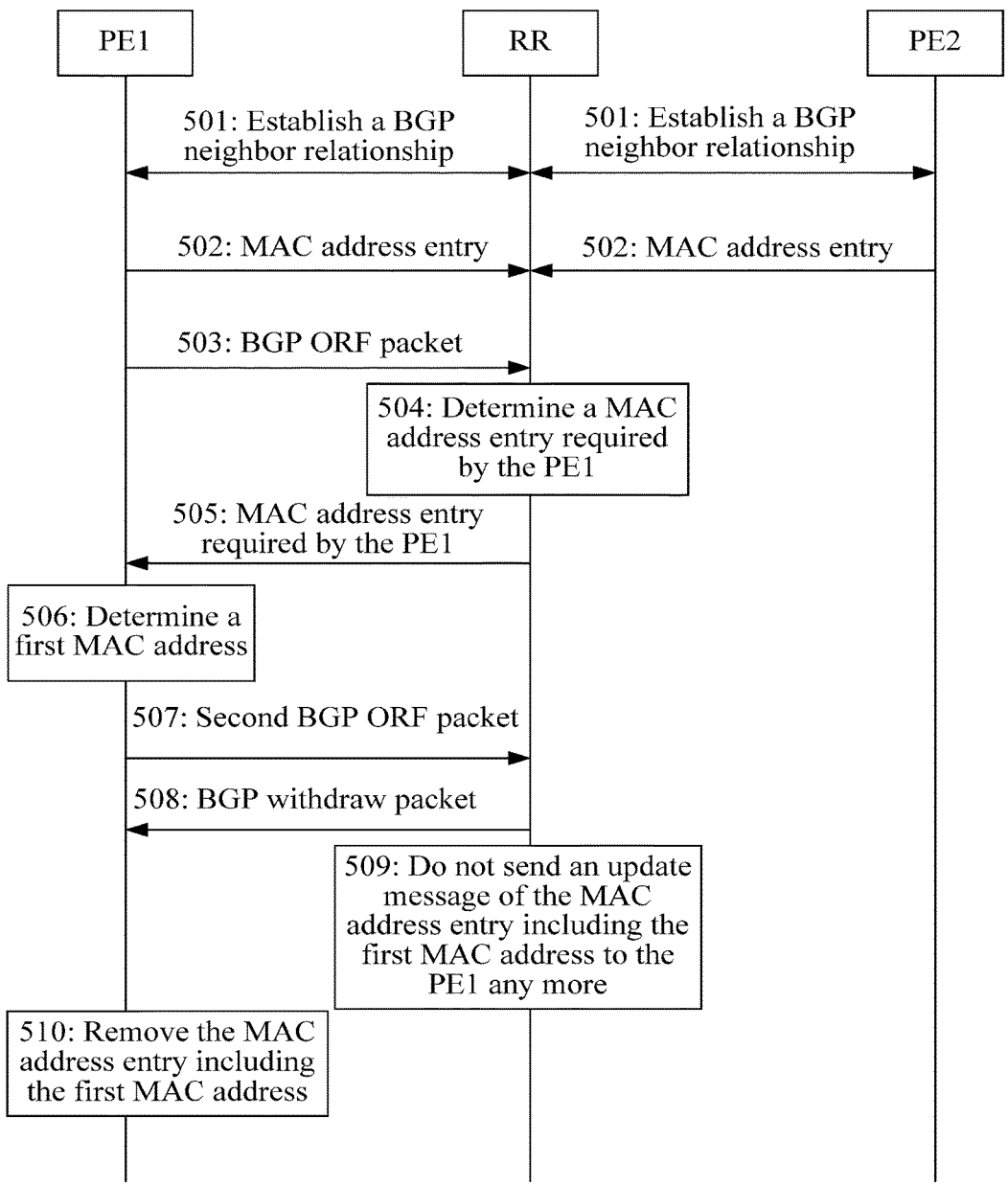
FIG. 5 is a schematic flow chart of another embodiment of a method for storing a MAC address entry according to the present disclosure.

FIG. 5 is a schematic flow chart of another embodiment of a method for storing a MAC address entry according to the present disclosure, where the method includes the following steps.

Step 501: An RR establishes a BGP neighbor relationship with all PEs in EVPN networking.

FIG. 5 only shows a PE1 and a PE2 that communicate with each other.

The RR may establish a BGP neighbor relationship with a PE using a manual configuration manner.

After establishing the BGP neighbor relationship, the RR and the PE may transmit a packet to each other.

In addition, in the embodiment of the present disclosure, the RR may refer to one RR, and may also refer to an RR group (RR group). In a case of the RR group, each RR or a designated RR establishes a BGP neighbor relationship with each PE, and acquires a MAC address entry subsequently. The designated RR may be pre-configured, or the designated RR may notify the PE that it is the designated RR.

Step 502: The PE1 and the PE2 separately send a MAC address entry to the RR.

The MAC address entry is a MAC address entry corresponding to each VPN, to which each PE connects. For example, taking the PE1 as an example, and assuming that VPNs connected to the PE1 are a VPN1 and a VPN2, the MAC address entries sent by the PE1 include a MAC address entry corresponding to the VPN1 and a MAC address entry corresponding to the VPN2. In different VPNs, the same MAC address may be used.

The PE sends the MAC address entry to the RR, and the RR may acquire MAC address entries of VPN Sites, to which all PEs connect, in the EVPN networking. The MAC address entries may form a MAC address table, so that the RR can send required MAC address entries to different PEs subsequently.

In addition, in this embodiment, after receiving a MAC address entry sent by a PE, the RR does not forward the MAC address entry to a peer before receiving a MAC address request sent by the peer. For example, after receiving the MAC address entry sent by the PE1, the RR does not forward the MAC address entry to the PE2 before receiving a MAC address request sent by the PE2, so as to avoid a problem resulting from that each PE stores all MAC addresses.

Step 503: After receiving a data packet, the PE1 sends a first BGP ORF packet to the RR.

Because the PE1 needs to forward the received data packet, the PE1 needs to know a MAC address entry corresponding to the data packet.

Referring to FIG. 2, FIG. 3a, and FIG. 3b, the first BGP ORF packet includes a destination MAC address, an RT and a standard header for indicating that a MAC address is added. The PE1 may directly acquire the destination MAC address from the data packet; for the RT, the PE1 may determine a VPN, to which the data packet belongs, according to an inbound interface of the data packet, and then obtain the foregoing RT according to a configured corresponding relationship between a VPN and an RT.

In addition, the foregoing data packet is preferably an initial data packet, and the initial data packet refers to a data packet, the destination MAC address of which is not included in a MAC address table stored locally.

Step 504: The RR determines a MAC address entry required by the PE1 according to the received first BGP ORF packet.

For example, the RT of the first BGP ORF packet is an RT1, and the RR may obtain that a VPN corresponding to the RT1 is a VPN1 according to the configured corresponding relationship between an RT and a VPN. Moreover, because there is a corresponding relationship between a VPN and a MAC address table in an address table stored by the RR, the RR may find a MAC address table corresponding to the VPN1. The MAC address table corresponding to the VPN1 may include multiple entries, and the RR determines an entry including the destination MAC address carried in the first BGP ORF packet as the MAC address entry required by the PE1.

Step 505: The RR sends the MAC address entry required by the PE1 to the PE1.

Afterwards, the PE1 may store the MAC address entry.

Further, the MAC address table is formed by one or multiple MAC address entries.

To improve storage efficiency of the PE, an aging mechanism may also be used, so that the MAC address table stored in the PE is enabled to change dynamically. That is, the method may further include:

Step 506: The PE1 determines a first MAC address, where the first MAC address is a MAC address included in a MAC address entry that needs aging in the MAC address table stored in the PE1.

The PE1 may determine the first MAC address using the following manner.

After storing the MAC address entry, the PE1 continues to receive a data packet, and if a destination MAC address in the data packet is in the stored MAC address entry, the data packet may be forwarded according to the stored MAC address entry.

Within a set time period, if the PE1 does not receive a data packet, the destination MAC address of which is a certain MAC address in the stored MAC address table, the PE1 may determine the certain MAC address as the foregoing first MAC address.

In addition, after determining MAC address entries required by the PEs, if these MAC address entries are updated, the RR sends update of the required MAC address entries to the PE. When the PE1 ages a certain MAC address entry, in order to reduce a signaling overhead, the PE1 may be instructed not to send update of the aged MAC address entry, namely, the method may further include:

Step 507: The PE1 sends a second BGP ORF packet to the RR.

Reference may be made to the BGP ORF packet shown in FIG. 2 for a format of the second BGP ORF packet. What is different from the first BGP ORF packet is that, Action in the first BGP ORF packet is equal to 0, while Action in the second BGP ORF packet is equal to 1.

Step 508: After receiving the second BGP ORF packet, the RR sends a BGP withdraw packet to the PE1, where the BGP withdraw packet includes a MAC address entry to which the first MAC address belongs.

Step 509: After sending the BGP withdraw packet, the RR does not send an update message of the MAC address entry including the first MAC address to the PE1 any more.

Step 510: After receiving the BGP withdraw packet, the PE1 removes the MAC address entry including the first MAC address.

In this embodiment, the PE sends the BGP ORF packet to the RR, and the RR determines the MAC address entry required by the PE according to the BGP ORF packet, which may implement that the PE only stores the MAC address entry required by itself rather than MAC address entries corresponding to all PEs, thereby implementing that the PE stores the MAC address entry according to need, and reducing demands for capacity and performance of the PE; and furthermore, in this embodiment, the aging mechanism may be used to improve the storage efficiency.

Figure 6:
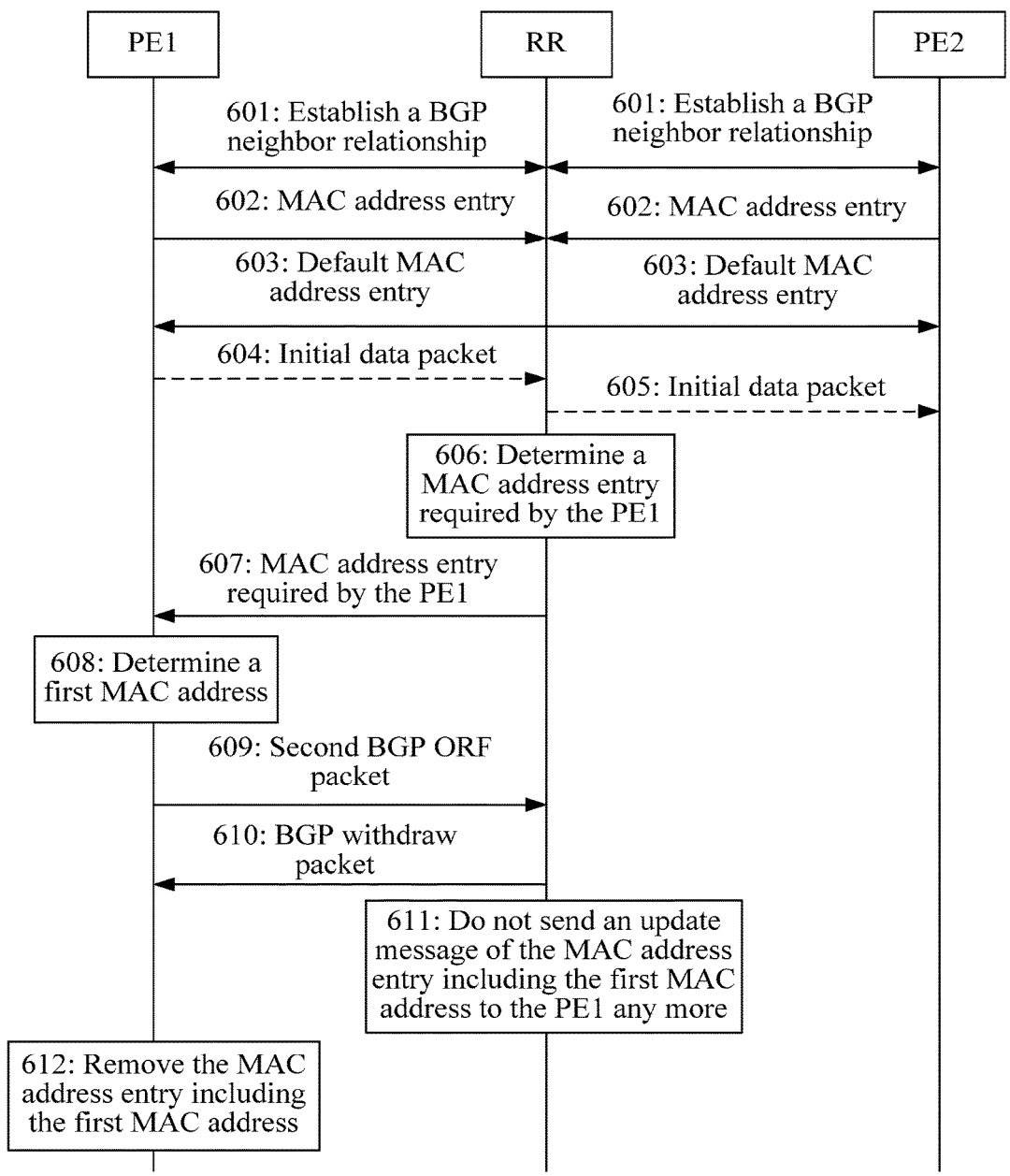
FIG. 6 is a schematic flow chart of another embodiment of a method for storing a MAC address entry according to the present disclosure.

FIG. 6 is a schematic flow chart of another embodiment of a method for storing a MAC address entry according to the present disclosure, where the method includes the following steps.

Step 601: An RR establishes a BGP neighbor relationship with all PEs in EVPN networking.

Step 602: A PE1 and a PE2 separately send a MAC address entry to the RR.

Reference may be made to steps 501 to 502 for specific content of the foregoing steps 601 to 602.

Step 603: The RR sends a default MAC address entry to the PE.

The default MAC address entry is used for instructing the PE to forward a data packet to the RR if a destination MAC address included in the data packet received by the PE is not in a local MAC address table. For example, a destination MAC address of a data packet received by the PE1 is a MAC1, but there is no information of the MAC1 in a locally stored MAC address table of the PE1, so the PE1 forwards the data packet to the RR according to a forwarding action corresponding to the default MAC address entry.

Specifically, it may be pre-configured in the PE that, when an initial data packet is received, forwarding it according to the default MAC address entry, and the forwarding action corresponding to the default MAC address entry is to forward the packet to the RR. For example, the default MAC address entry includes the following information: a default MAC address (for example, all zeros) and a corresponding forwarding action (for example, tunnel information corresponding to a next hop, and a label operation instruction). An address of the next hop of the forwarding action is an IP address of the RR, and the label operation instruction is used for instructing the PE to attach a designated label when forwarding the data packet, so that a recipient can determine a VPN to which the data packet belongs according to the label.

Step 604: When receiving the initial data packet, the PE1 forwards the initial data packet to the RR.

The initial data packet refers to a received data packet, the destination MAC address of which is not in the locally stored MAC address table.

The PE1 already acquires the default MAC address entry, and the default MAC address entry instructs forwarding of the initial data packet to the RR, so the PE1 forwards the initial data packet to the RR according to the default MAC address entry.

Step 605: The RR forwards the initial data packet to the PE2.

Because the RR has MAC address entries of all PEs, the RR may implement forwarding of the initial data packet according to the MAC address entries.

Step 606: The RR determines a MAC address entry required by the PE1 according to the initial data packet.

The RR may acquire the destination MAC address from the data packet, acquire VPN information according to the label of the data packet, and then determine, according to a corresponding relationship between a VPN and a MAC address table, a MAC address table corresponding to the VPN to which the data packet belongs, and finally determine an entry which includes the destination MAC address and is included in the corresponding MAC address table as the MAC address entry required by the PE1.

Step 607: The RR sends the MAC address entry required by the PE1 to the PE1.

Afterwards, the PE1 may store the MAC address entry.

Furthermore, similar to the previous embodiment, an aging procedure may be further included, for example, the method may further includes the following steps.

Step 608: The PE1 determines a first MAC address, where the first MAC address is a MAC address in a MAC address entry that needs aging in the MAC address table stored in the PE1.

Step 609: The PE1 sends a second BGP ORF packet to the RR.

Step 610: After receiving the second BGP ORF packet, the RR sends a BGP withdraw (withdraw) packet to the PE1, where the BGP withdraw packet includes a MAC address entry to which the first MAC address belongs.

Step 611: After sending the BGP withdraw packet, the RR does not send an update message of the MAC address entry including the first MAC address to the PE1 any more.

Step 612: After receiving the BGP withdraw packet, the PE1 removes the MAC address entry including the first MAC address.

Reference may be made to steps 506 to 510 for specific content of steps 608 to 612.

In this embodiment, the PE sends the initial data packet to the RR, and the RR determines the MAC address entry required by the PE according to the initial data packet, which may implement that the PE only stores the MAC address entry required by itself rather than MAC address entries corresponding to all PEs, thereby implementing that the PE stores the MAC address entry according to need, and reducing demands for capacity and performance of the PE. Moreover, in this embodiment, an aging mechanism may be used to improve storage efficiency; and furthermore, in this embodiment, the RR has an initial data packet forwarding function, which may avoid a delay of the initial data packet, and improve system performance.

Figure 7:
FIG. 7 is a schematic structural diagram of an embodiment of a device for storing a MAC address entry according to the present disclosure.

FIG. 7 is a schematic structural diagram of an embodiment of a device for storing a MAC address entry according to the present disclosure. The device is, for example, a PE. The device includes a first sending module 71 and a storage module 72. The first sending module 71 is configured to send a first packet to an RR, so that the RR determines a MAC address entry required by the PE according to the first packet, where the RR pre-stores a MAC address table, and the MAC address table includes the required MAC address entry. The storage module 72 is configured to receive a packet which includes the required MAC address entry and is sent by the RR, and store the required MAC address entry.

Figure 8:
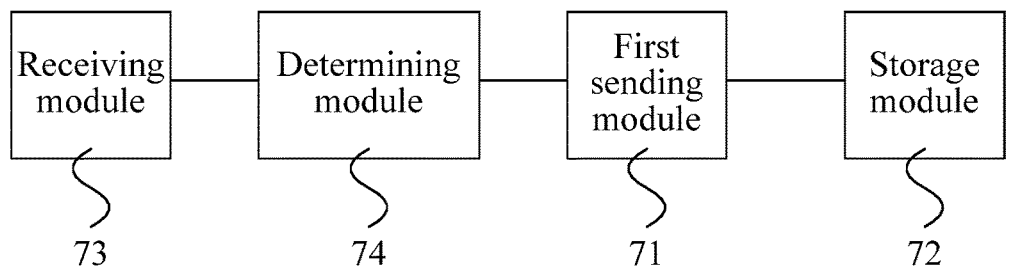
FIG. 8 is a schematic structural diagram of another embodiment of a device for storing a MAC address entry according to the present disclosure.

Referring to FIG. 8, the device for storing the MAC address entry may further include: a receiving module 73 and a determining module 74. The receiving module 73 is configured to receive a data packet, where the data packet includes a destination MAC address. The determining module 74 is configured to determine a VPN to which the data packet belongs. The first sending module 71 is specifically configured to send the first packet to the RR, where the first packet includes the destination MAC address and information for indicating the VPN.

Optionally, the first sending module 71 is specifically configured to: send a first BGP ORF packet, where the first BGP ORF packet is a packet combining first MAC ORF and RT ORF. The first MAC ORF includes the destination MAC address and a standard header for indicating that the destination MAC address is added, and the RT ORF includes an RT corresponding to the VPN to which the data packet belongs, so that the RR determines a corresponding VPN according to the RT, and determines a MAC address entry which corresponds to the VPN and includes the destination MAC address as the required MAC address entry.

Optionally, the first sending module 71 is specifically configured to: forward the data packet received by the receiving module 73 to the RR, where the data packet includes the destination MAC address and a label for indicating the VPN, so that the RR determines a corresponding VPN according to the label, and determines a MAC address entry which corresponds to the VPN and includes the destination MAC address as the required MAC address entry.

Figure 9:
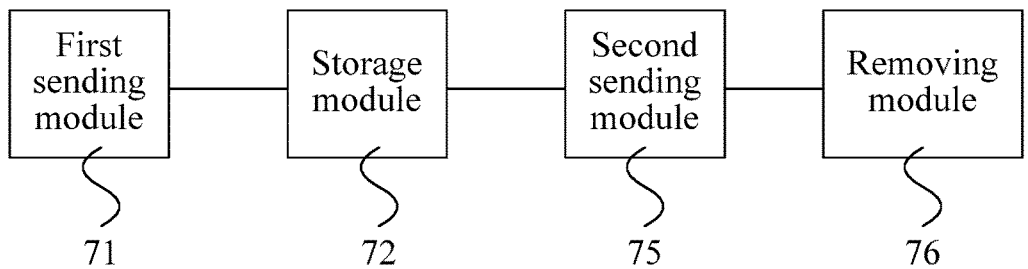
FIG. 9 is a schematic structural diagram of another embodiment of a device for storing a MAC address entry according to the present disclosure.

Referring to FIG. 9, the device may further include: a second sending module 75 and a removing module 76. The second sending module 75 is configured to send a second BGP ORF packet to the RR, where the second BGP ORF packet is a packet combining second MAC ORF and RT ORF. The second MAC ORF includes a first MAC address and a standard header for instructing removing of the first MAC address, and the RT ORF includes an RT, so that after receiving the second BGP ORF packet, the RR determines a corresponding VPN and a MAC address entry which corresponds to the VPN and includes the first MAC address according to the RT and sends a BGP withdraw packet to the PE. The BGP withdraw packet includes a MAC address entry to which the first MAC address belongs, so that an update message of the MAC address entry which corresponds to the VPN and includes the first MAC address is not sent to the PE any more. The removing module 76 is configured to receive the BGP withdraw packet, and then remove the MAC address entry including the first MAC address.

Figure 10:
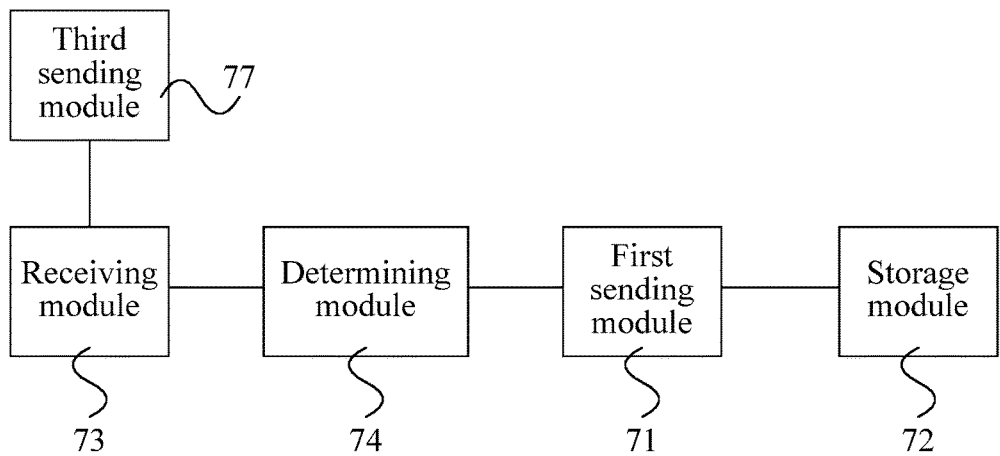
FIG. 10 is a schematic structural diagram of another embodiment of a device for storing a MAC address entry according to the present disclosure.

Referring to FIG. 10, the data packet is a data packet which is received by the PE for the first time and includes the destination MAC address. The device further includes: a third sending module 77, configured to forward the data packet which is received for the first time and includes the destination MAC address to the RR, and the data packet is forward to a peer PE through the RR.

Figure 11:
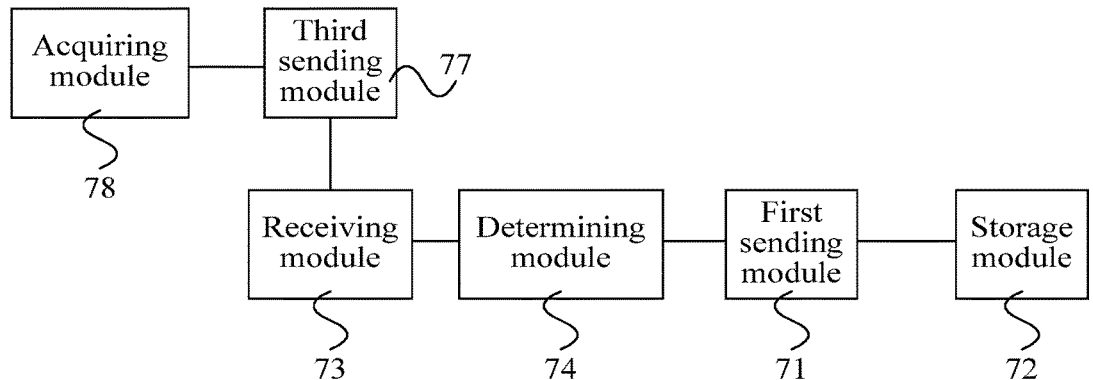
FIG. 11 is a schematic structural diagram of another embodiment of a device for storing a MAC address entry according to the present disclosure.

Referring to FIG. 11, the device further includes: an acquiring module 78, configured to acquire a default MAC address entry, where the default MAC address entry is used to forward the data packet to the RR when the destination MAC address included in the received data packet is not in a local MAC address table.

In this embodiment, the PE sends the first packet to the RR, and the RR determines the MAC address entry required by the PE according to the first packet, which may implement that the PE only stores the MAC address entry required by itself rather than MAC address entries corresponding to all PEs, thereby implementing that the PE stores the MAC address entry according to need, and reducing demands for capacity and performance of the PE.

Figure 12:
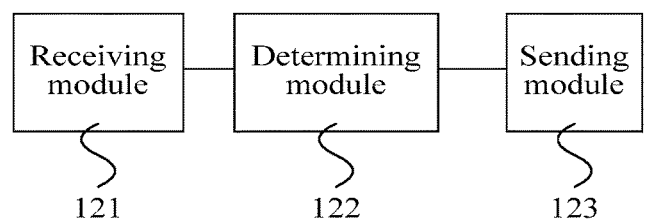
FIG. 12 is a schematic structural diagram of another embodiment of a device for sending a MAC address entry according to the present disclosure.

FIG. 12 is a schematic structural diagram of an embodiment of a device for sending a MAC address entry according to the present disclosure. The device may be an RR. The device includes a receiving module 121, a determining module 122, and a sending module 123. The receiving module 121 is configured to receive a first packet sent by a PE. The determining module 122 is configured to determine a MAC address entry required by the PE according to the first packet, where the RR pre-stores a MAC address table including the required MAC address entry. The sending module 123 is configured to send the required MAC address entry to the PE.

Optionally, the receiving module is specifically configured to receive a first BGP ORF packet sent by the PE, where the first BGP ORF packet is a packet combining first MAC ORF and RT ORF. The first MAC ORF includes a destination MAC address and a standard header for indicating that the destination MAC address is added, and the RT ORF includes an RT. The destination MAC address is a destination MAC address included in a data packet received by the PE, and the RT is an RT corresponding to a VPN to which the data packet belongs.

The determining module is specifically configured to determine a corresponding VPN according to the RT, and determine a MAC address entry which corresponds to the VPN and includes the destination MAC address as the required MAC address entry.

Optionally, the receiving module is specifically configured to receive a data packet forwarded by the PE, where the data packet includes the destination MAC address and a label for indicating the VPN.

The determining module is specifically configured to determine a VPN according to the label, and determine a MAC address entry which corresponds to the VPN and includes the destination MAC address as the required MAC address entry.

Figure 13:
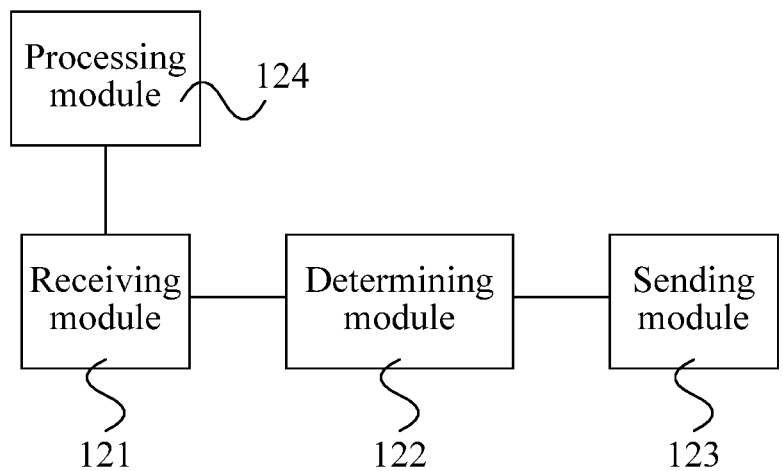
FIG. 13 is a schematic structural diagram of another embodiment of a device for sending a MAC address entry according to the present disclosure.

Referring to FIG. 13, the device further includes a processing module 124, configured to receive a second BGP ORF packet sent by the PE, determine a VPN corresponding to the RT and an address entry including the first MAC address in the MAC address table which corresponds to the VPN, and send a BGP withdraw packet to the PE. The second BGP ORF packet is a packet combining second MAC ORF and RT ORF. The second MAC ORF includes a first MAC address and a standard header for instructing removing of the first MAC address, and the RT ORF includes an RT. The first MAC address is a MAC address which is in the required MAC address entry and not included in a destination MAC address of a data packet subsequently received by the PE within set time. The BGP withdraw packet includes a MAC address entry to which the first MAC address belongs, so that the PE removes the MAC address entry including the first MAC address after receiving the BGP withdraw packet. After the BGP withdraw packet is sent, an update message of the MAC address entry including the first MAC address is not sent to the PE any more.

Figure 14:
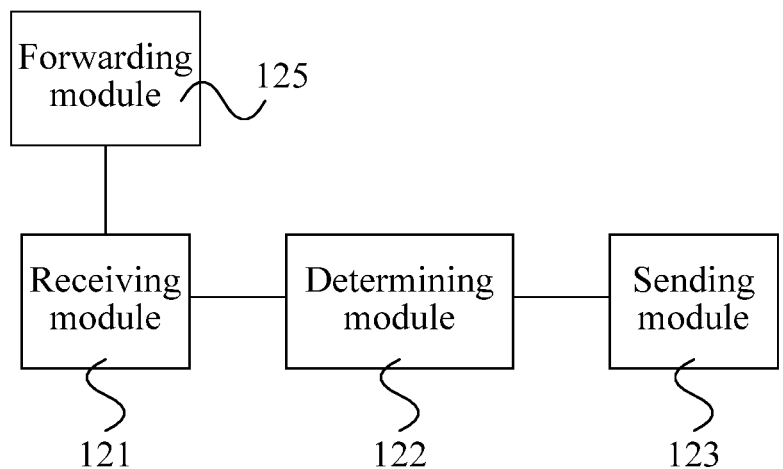
FIG. 14 is a schematic structural diagram of another embodiment of a device for sending a MAC address entry according to the present disclosure.

Referring to FIG. 14, the device further includes: a forwarding module 125, configured to receive an initial data packet forwarded by the PE, and forward the initial data packet to a peer PE, where the initial data packet is a data packet which is received by the PE for the first time and the destination MAC address of which is not in a local MAC address table of the PE.

Figure 15:
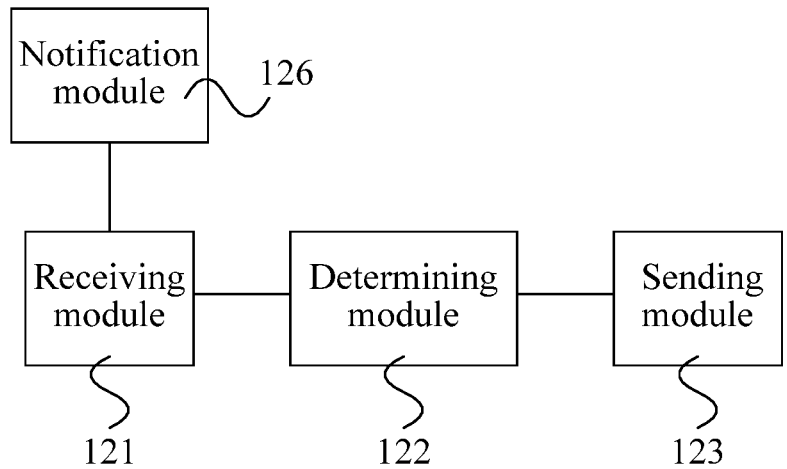
FIG. 15 is a schematic structural diagram of another embodiment of a device for sending a MAC address entry according to the present disclosure.

Referring to FIG. 15, the device further includes: a notification module 126, configured to send a default MAC address entry to the PE, where the default MAC address entry is used to instruct the PE to forward the data packet to the RR when the destination MAC address included in the received data packet is not in the local MAC address table of the PE.

Figure 16:
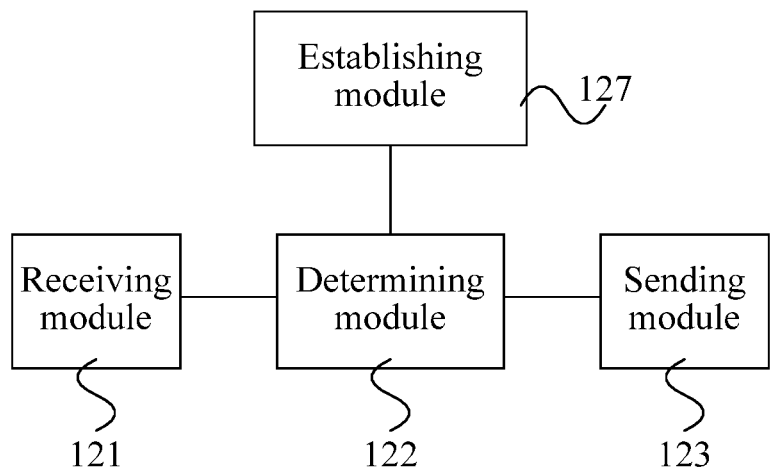
FIG. 16 is a schematic structural diagram of another embodiment of a device for sending a MAC address entry according to the present disclosure.

Referring to FIG. 16, the device further includes: an establishing module 127, configured to establish a BGP neighbor relationship with each PE, receive and store a MAC address entry corresponding to a VPN connected to each PE through the neighbor relationship, and obtain the MAC address table.

In this embodiment, the PE sends the first packet to the RR, and the RR determines the MAC address entry required by the PE according to the first packet, which may implement that the PE only stores the MAC address entry required by itself rather than MAC address entries corresponding to all PEs, thereby implementing that the PE stores the MAC address entry according to need, and reducing demands for capacity and performance of the PE.

Figure 17:
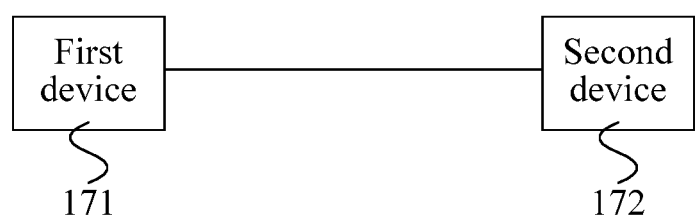
FIG. 17 is a schematic structural diagram of an embodiment of a network system according to the present disclosure.

FIG. 17 is a schematic structural diagram of an embodiment of a network system according to the present disclosure. The network system includes a first device 171 and a second device 172, where the first device 171 may be illustrated as any one of FIG. 7 to FIG. 11, and the second device 172 may be illustrated as any one of FIG. 12 to FIG. 16.

In this embodiment, the PE sends the first packet to the RR, and the RR determines the MAC address entry required by the PE according to the first packet, which may implement that the PE only stores the MAC address entry required by itself rather than MAC address entries corresponding to all PEs, thereby implementing that the PE stores the MAC address entry according to need, and reducing demands for capacity and performance of the PE. Persons of ordinary skill in the art may understand that all or part of the steps of the foregoing method embodiments may be implemented by a program instructing relevant hardware. The program may be stored in a computer readable storage medium. When the program is run, the steps of the foregoing method embodiments are performed. The storage medium may be any medium that is capable of storing program codes, such as a ROM, a RAM, a magnetic disk, and an optical disk.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments, or make equivalent replacements to part of or all of the technical features; however, these modifications or replacements do not make the essence of the corresponding technical solutions depart from the scope of the technical solutions in the embodiments of the present disclosure.

What is claimed is:

1. A method, comprising:
   receiving, by a provider network edge (PE), a data packet, wherein the data packet comprises a destination media access control (MAC) address;
   determining, by the PE, a first Ethernet virtual private network (EVPN) to which the data packet belongs;
   sending, by the PE, a first border gateway protocol outbound route filter (BGP ORF) packet to a route reflector (RR), wherein the first BGP ORF packet comprises a first MAC ORF and a first route target (RT) ORF, the first MAC ORF comprises the destination MAC address, and the first RT ORF comprises a first RT corresponding to the first EVPN to which the data packet belongs;
   receiving, by the PE, a packet which comprises a MAC address entry and is sent by the RR; and
   storing the MAC address entry.

2. The method according to claim 1, wherein the data packet is a data packet which is received by the PE for the first time and comprises the destination MAC address.

3. The method according to claim 1, wherein the first MAC ORF further comprises a standard header indicating that the destination MAC address has been added to the first MAC ORF.

4. The method according to claim 3, wherein after storing the MAC address entry, the method further comprises:
   within a set time period, when a destination MAC address of a subsequently received data packet does not comprise a first MAC address in the MAC address entry, sending, by the PE, a second BGP ORF packet comprising the first MAC address to the RR, wherein the second BGP ORF packet comprises a second MAC ORF and a second RT ORF, the second MAC ORF comprises the first MAC address and a standard header instructing removal of the first MAC address, and the second RT ORF comprises a second RT; and
   after receiving a BGP withdraw packet, removing, by the PE, the MAC address entry, wherein the MAC address entry comprises the first MAC address.

5. The method according to claim 1, wherein the MAC address entry comprises a next hop to the destination MAC address.

6. A method, comprising:
   receiving, by a route reflector (RR), a first border gateway protocol outbound route filter (BGP ORF) packet sent by a provider network edge (PE), wherein the first BGP ORF packet comprises a first media access control (MAC) ORF and a first route target (RT) ORF, the first MAC ORF comprises a destination MAC address, the first RT ORF comprises a first RT, the destination MAC address is comprised in a data packet received by the PE, and the first RT corresponds to a first Ethernet virtual private network (EVPN) to which the data packet belongs;
   determining, by the RR, the first EVPN corresponding to the first RT, and determining a MAC address entry, where the determined MAC address entry corresponds to the first EVPN and comprises the destination MAC address, wherein a MAC address table comprising the MAC address entry is stored in the RR; and
   sending, by the RR, the MAC address entry to the PE.

7. The method according to claim 6, further comprising:
   establishing, by the RR, a BGP neighbor relationship with each PE; and
   receiving and storing, by the RR, MAC address entries corresponding to VPNs connected to each PE, and obtaining the MAC address table.

8. The method according to claim 6, wherein the first MAC ORF further comprises a standard header indicating that the destination MAC address has been added to the first MAC ORF.

9. The method according to claim 8, further comprising:
receiving, by the RR, a second BGP ORF packet sent by the PE, wherein the second BGP ORF packet comprises second MAC ORF and second RT ORF, the second MAC ORF comprises a first MAC address and a standard header instructing removal of the first MAC address, the second RT ORF comprises a second RT, and the first MAC address is in the MAC address entry and not comprised in a destination MAC address of a data packet subsequently received by the PE within a set time period;

after receiving the second BGP ORF packet, determining, by the RR, a second EVPN corresponding to the second RT and an address entry in a MAC address table which corresponds to the second EVPN and comprises the first MAC address; and sending, by the RR, a BGP withdraw packet to the PE, wherein the BGP withdraw packet comprises a MAC address entry to which the first MAC address belongs, wherein after receiving the BGP withdraw packet, the PE removes the MAC address entry comprising the first MAC address.

10. The method according to claim 6, wherein the MAC address entry further comprises a next hop to the destination MAC address.

11. A device, comprising:
a processor, configured to:
receive a data packet, wherein the data packet comprises a destination media access control (MAC) address;
determine a first Ethernet virtual private network (EVPN) to which the data packet belongs;
send a first border gateway protocol outbound route filter (BGP ORF) packet to a route reflector (RR) to require a MAC address entry, wherein the first BGP ORF packet comprises a first MAC ORF and a first route target (RT) ORF, the first MAC ORF comprises the destination MAC address, and the first RT ORF comprises a first RT corresponding to the first EVPN to which the data packet belongs; and
receive a packet which comprises the required MAC address entry and is sent by the RR; and
a storage device, configured to store the required MAC address entry.

12. The device according to claim 11, wherein the first MAC ORF further comprises a standard header indicating that the destination MAC address has been added to the first MAC ORF.

13. The device according to claim 12, wherein the processor is further configured to:
send a second BGP ORF packet to the RR, wherein the second BGP ORF packet comprises a second MAC ORF and second RT ORF, the second MAC ORF comprises a first MAC address and a standard header instructing removing of the first MAC address, and the second RT ORF comprises a second RT; and
after a BGP withdraw packet is received, remove the MAC address entry comprising the first MAC address.

14. The device according to claim 11, wherein the required MAC address entry comprises a next hop to the destination MAC address.

15. A device, comprising:
a processor, configured to:
receive a first border gateway protocol outbound route filter (BGP ORF) packet sent by a provider network edge (PE),wherein the first BGP ORF packet comprises a first media access control (MAC) ORF and a first route target (RT) ORF, the first MAC ORF comprises a destination MAC address, the first RT ORF comprises a first RT, the destination MAC address is comprised in a data packet received by the PE, and the first RT corresponds to a first Ethernet virtual private network (EVPN) to which the data packet belongs;

determine the first EVPN according to the first RT, and determine a MAC address entry which corresponds to the first EVPN and comprises the destination MAC address as a required MAC address entry, wherein the device stores a MAC address table comprising the required MAC address entry; and send the required MAC address entry to the PE; and
a storage device, configured to store the MAC address table.

16. The device according to claim 15, wherein the processor is further configured to:
establish a BGP neighbor relationship with each PE, receive and store MAC address entries corresponding to EVPNs connected to each PE, and obtain the MAC address table.

17. The device according to claim 15, wherein the first MAC ORF further comprises a standard header indicating that the destination MAC address has been added to the first MAC ORF.

18. The device according to claim 17, wherein the processor is further configured to:
receive a second BGP ORF packet sent by the PE, wherein the second BGP ORF packet comprises a second MAC ORF and a second RT ORF, the second MAC ORF comprises a first MAC address and a standard header instructing removing of the first MAC address, the second RT ORF comprises a second RT, the first MAC address is comprised in the required MAC address entry and not comprised in a destination MAC address of a data packet subsequently received by the PE within a set time period;

after receiving the second BGP ORF packet, determine a second EVPN corresponding to the second RT and an address entry which corresponds to the second EVPN and comprises the first MAC address in the MAC address table; and send a BGP withdraw packet to the PE, wherein the BGP withdraw packet comprises a MAC address entry to which the first MAC address belongs.

19. The device according to claim 15, wherein the required MAC address entry further comprises a next hop to the destination MAC address.

20. A system, comprising:
a provider network edge (PE) comprising a first processor; and
a route reflector (RR) comprising a second processor;
wherein the first processor is configured to:
receive a data packet, wherein the data packet comprises a destination media access control (MAC) address;
determine a first Ethernet virtual private network (EVPN) to which the data packet belongs;
send a first border gateway protocol outbound route filter (BGP ORF) packet to the RR to require a MAC address entry, wherein the first BGP ORF packet comprises a first MAC ORF and a first route target (RT) ORF, the first MAC ORF comprises the destination MAC address and a standard header indicating that the destination MAC address has been added, and the first RT ORF comprises a first RT corresponding to the first EVPN to which the data packet belongs;

receive a packet which comprises the required MAC address entry and is sent by the RR; and store the required MAC address entry;

wherein the second processor is configured to:

receive the first BGP ORF packet sent by the first processor of the PE;

determine the first EVPN according to the first RT, and determine a MAC address entry which corresponds to the first EVPN and comprises the destination MAC address as the required MAC address entry;

send the required MAC address entry to the PE; and store a MAC address table which comprises the required MAC address entry.

21. The system according to claim 20, wherein the first MAC ORF further comprises a standard header indicating that the destination MAC address has been added to the first MAC ORF.

22. The system according to claim 20, wherein the required MAC address entry further comprises a next hop to the destination MAC address.

\* \* \* \* \*